United States Patent  [11] 3,607,832

[72] Inventor Peter R. A. Hansen
 Glamorgan, Wales
[21] Appl. No. 866,030
[22] Filed Oct. 13, 1969
[45] Patented Sept. 21, 1971
[73] Assignee Midland Silicones Limited
 Reading, Berkshire, England
[32] Priority Oct. 18, 1968
[33] Great Britain
[31] 49,618/68

[54] SILICON-CONTAINING COMPOSITIONS
 9 Claims, No Drawings
[52] U.S. Cl................................................260/46.5 UA,
 117/135.1 R, 117/161 ZA, 252/63.7 R,
 260/32.4 R, 260/33.6 SB, 260/37 SB, 260/46.5 H,
 260/46.5 G, 260/825 R, 260/82.7 R
[51] Int. Cl..................................................... C08f 11/04
[50] Field of Search........................................ 260/46.5 G,
 .46.5 U, 46.5 H, 825, 827, 32.4, 448.2 U

[56] References Cited
UNITED STATES PATENTS

| | | | |
|---|---|---|---|
| 3,313,773 | 4/1967 | Lamoreaux................... | 260/46.5 |
| 3,344,111 | 9/1967 | Chalk........................... | 260/46.5 |
| 3,445,420 | 5/1969 | Kookootsedes et al....... | 260/37 |
| 3,220,972 | 11/1965 | Lamoreaux................... | 260/46.5 |

Primary Examiner—Donald E. Czaja
Assistant Examiner—M. I. Marquis
Attorneys—Robert F. Fleming, Jr. and Laurence R. Hobey ABSTRACT: Organosilicon compositions comprising (1) a compound containing aliphatic carbon atoms linked by multiple bonds, such as isoprene or organopolysiloxanes containing vinyl substituents, (2) a silicon compound containing at least one ≡SiH in the molecule, such as methylhydrogen polysiloxane, (3) a platinum catalyst, and (4) a sufficient amount to retard reaction at room temperature between (1) and (2) of a compound containing at least one ketoxime group, such as methylethyl ketoxime, are disclosed as heat curable elastomers.

SILICON-CONTAINING COMPOSITIONS

This invention relates to the reaction of silicon compounds containing silicon-bonded hydrogen atoms with compounds containing olefinic or acetylenic unsaturation.

It is now well known that silicon compounds containing silicon-bonded hydrogen atoms may be reacted with organic or organosilicon compounds containing olefinic or acetylenic unsaturation in the presence of a platinum catalyst, for example, a platinum metal, a compound or a complex of a platinum metal. This reaction is now extensively documented in the art, for example, in U.S. Pat. No. 2,823,218, and has been applied in the preparation of a variety of silicon-containing products. In many cases, the reaction proceeds at temperatures of about 25° C. but can be expedited, when desired, by raising the temperature of the reaction mixture or be increasing the proportion of the catalyst present. The tendency for the reaction to proceed at lower temperatures is, however, sometimes disadvantageous. For example, one application of the reaction resides in the preparation of elastomeric or gellike material from a mixture of an organohydrogen polysiloxane and an organosilicon polymer containing silicon-bonded vinyl radicals. In order to obtain a storage stable product, it is necessary to avoid bringing all of the active ingredients together until the composition is required to vulcanize. This requires that the product be supplied as a two-package preparation.

It is also sometimes the case that when a sufficient amount of the catalyst is employed to give the desired cure rate, at an elevated temperature, the pot-life, that is, the working-life of the mixture at the lower ambient temperatures, is inconveniently short. There has, therefore, existed a need for a means of inhibiting the reaction involving the addition of a silicon-hydrogen compound to an olefinically or acetylenically unsaturated compound in the presence of a platinum catalyst.

We have now found as an embodiment of this invention that the presence in the reaction mixture of a compound containing at least one oxime group has the effect of significantly reducing the rate at which the addition reaction proceeds at lower temperatures. As the addition reaction proceeds normally at elevated temperatures the use of the said oxime compounds permits the preparation of one-package, curable organopolysiloxane composites which are stable on storage, prior to use, for considerable periods of time.

According to this invention there is provided an organosilicon composition comprising (1) a compound containing aliphatic carbon atoms linked by multiple bonds, (2) a silicon compound containing at least one silicon-bonded hydrogen atom in the molecule, (3) a platinum catalyst, and (4) an amount of a compound containing at least one oxime group sufficient to retard the reaction between (1) and (2) at 25° C.

This invention also includes a process for the preparation of organosilicon materials, wherein the said composition is heated and further includes the organosilicon materials obtained thereby.

As ingredient (1) of the compositions of this invention, there can be employed any compound containing aliphatic carbon atoms linked by double bonds and which are not gaseous at ambient temperatures. Thus, the compound can be purely organic or it can contain the unsaturated groups in association with, for example, metallic atoms, as in organosilicon compounds. Examples of purely organic compounds are unsaturated hydrocarbons such as isoprene, butadiene, octadecene, cyclohexene, phenylacetylene, vinyl or allyl ethers such as 2-methoxyethoxy ethylene and allyl glycidyl ether, vinyl acetate, acrolein acetal, crotonaldehyde, allyl alcohol, allyl esters of polybasic acids, such as triallyl cyanurate and diallyl succinate and glycol esters of methacrylic acid. Examples of operative organosilicon compounds are organosilanes, organosilazanes, organosilcarbanes and organosiloxanes in which at least one of the organic radials per molecule contain carbon atoms linked by multiple bonds. This invention, however, finds particular application in a heat-activated curing system for organosilicon compositions of the kind involving the addition of an organosilicon polymer containing aliphatic unsaturation, to a compound containing silicon-bonded hydrogen atoms. The preferred compounds(1) for use in the compositions of the invention, therefore, are organosilicon polymers and copolymers wherein at least two of the silicon atoms have attached thereto a radical containing aliphatic unsaturation such as vinyl, allyl, methallyl, butadienyl, cyclohexenyl, and vinylphenyl. From considerations of commercial availability, the preferred unsaturated radicals are vinyl radicals. When the compound (1) is an organosilicon polymer or copolymer, it can be resinous or nonresinous in nature. Thus, it can be, for example, an organopolysiloxane liquid, a highly polymerized diorganopolysiloxane or mixtures of two or more organosilicon materials.

The organic radicals present in the organosilicon polymer or copolymer, in addition to the radicals containing the required aliphatic unsaturation, can be selected from monovalent hydrocarbon and substituted hydrocarbon radicals free of aliphatic unsaturation. Examples of such monovalent radicals include alkyl radicals such as methyl, ethyl, propyl, butyl, and octadecyl, cycloalkyl radicals such as cyclopentyl and cyclohexyl, aryl radicals such as phenyl and tolyl, aralkyl radicals such as benzyl and 2-phenylethyl radicals, halohydrocarbon radicals such as chlorophyenyl, bromomethyl and 3,3,3-trifluoropropyl radicals, cyanoalkyl radicals and aminoalkyl radicals. The most preferred organosilicon polymers are the diorganopolysiloxanes wherein the organic radicals present in addition to the radicals containing aliphatic unsaturation are selected from methyl, phenyl, and trifluoropropyl, radicals, at least 50 percent of the total radicals being methyl. Examples of the preferred compounds for use as ingredient (1) in the compositions of this invention, therefore, are polydimethylsiloxanes, copolymers of dimethysiloxanes and phenylmethylsiloxanes, copolymers of dimethylsiloxanes and methyltrifluoropropylsiloxane and copolymers of the with end-stopping units such as trimethylsiloxane units and methyldiphenylsiloxane units, each of which contain a proportion of silicon-bonded unsaturated radicals. If desired, at least some of the groups containing multiple bonds can be attached to the terminal silicon atoms in the polydiorganosiloxane. Thus, the polydiorganosiloxanes can be end-stopped with units such as dimethylvinylsiloxnae units and diphenylmethallylsiloxane units.

Component (2) of the compositions of this invention can be any organosilicon compound containing silicon-bonded hydrogen atoms. Thus, it can be, for example, a silane, a siloxane polymer, a cyclic siloxane, a silcarbane polymer or a polymer containing both silcarbane and siloxane linkages. The organic groups present in component (2) can be any monovalent hydrocarbon radicals or monovalent halohydrocarbon radicals, as exemplified for component (1). As with component (1), the preferred silicon-hydrogen compounds are the linear or substantially linear siloxane polymers containing methyl and/or phenyl radicals as the organic substituents. The preferred silicon-hydrogen compounds are homopolymers or copolymers and can be, for example, polymers composed solely of $(CH_3)HSiO$ units or of such units with copolymeric units such as dimethylsiloxane units, phenylmethylsiloxane units and trimethylsiloxane units. If desired, at least some of the silicon-bonded hydrogen atoms can be attached to terminal silicon atoms. Thus, component (2) can be, for example, a copolymer of $(CH_3)_2SiO$ and/or $(CH_3)HSiO$ units and $(CH_3)_2HSiO_{1/2}$ units.

A wide variety of platinum catalysts are known for promoting the addition of unsaturated compounds and compounds containing silicon-bonded hydrogen atoms and any of these can be employed in the compositions of this invention. Typical of such catalysts are metallic platinum, platinum deposited on supports such as charcoal or alumina, ruthenium, rhodium, palladium, iridium, salts, of the platinum metals including platinic chloride and chloroplatinic acid and complexes obtained by reacting platinum compounds with unsaturated compounds such as cyclohexene. The preferred form of platinum catalyst is chloroplatinic acid, either in the anhydrous form, as the hexahydrate or as a complex formed by reaction of the chloroplatinic acid with a siloxane-containing silicon-bonded vinyl radical. The platinum catalyst can be employed in quantities conventional in the art, that is, from about 4 to about 30 parts of platinum per million parts of the combined weight of components (1) and (2). However, provided there is sufficient platinum present to exert the desired catalytic effect, the proportion employed is not narrowly critical and proportions less than 1 and greater than 30 parts per million can be suitable in some cases.

Any compound containing oxime groups can be employed as component (4) of the compositions. Examples of such compounds are methylethyl ketoxime, acetaldoxime, acetoxime, dimethyl glyoxime, cyclohexane-1,2-dionedioxime, 2,4-pentanedione dioxime and butanedionemethyloxime. Methylethyl ketoxime is preferred since it is a liquid and, therefore, readily dispersible in the composition. The quantity of oxime compound employed will depend of the proportion of platinum catalyst present an can also depend on whether the catalyst and oxime compound are incorporated into the composition separately or together. Preferably, the proportion of the oxime compound employed falls within the range from 1 to 100 moles per mole of platinum catalyst.

The relative proportions of components (1) and (2) of the compositions will depend mainly on the intended nature of the end product. Thus, both the nature and relative proportions of these two components can be determined on the basis of principles now well established in the art. For example, when the composition is intended for the production of a potting gel, the relative molar proportions of the components can be selected as described, for example, in U.S. Ser No. 745,270, now abandoned.

The invention is, however, of particular interest in compositions which are heat-curable to elastomeric materials. In such a case, the relative molar proportions of the silicon-hydrogen atoms and unsaturated radicals will be chosen to give the desired degree of cure. When intended for use in the preparation of elastomers, the compositions of this invention will contain, in general, a proportion of unsaturated radicals to silicon-bonded hydrogen atoms in the range form about 5:1 to 1:5.

The compositions of this invention can contain fillers and/or other additives which can be required to modify the properties of the finished product. Examples of fillers include silicas such as fume silicas, precipitated silicas, diatomaceous earths and ground silica, zinc oxide, zirconium silicate, calcium carbonate and titanium dioxide. Any additive which may function to poison the platinum catalyst should, of course, be excluded.

The compositions of this invention are particularly useful in silicone elastomers having electrically conductive properties. Such elastomers find wide application in the manufacture of heating elements, for which application they are normally coated in a thin layer on a supporting substrate whereafter cure of the coating to a conductive elastomer is effected by the application of heat. Of particular interest in the compositions of this invention are fillers such as carbon blacks, graphite and finely divided metals which are capable of conferring electrically conductive properties on the cured composition.

The use of an oxime compound as cure inhibitor, according to this invention, can significantly retard the rate of reaction at room temperature between silicon-bonded hydrogen atoms and unsaturated radicals. At temperatures above about 60° C., however, the inhibiting effect is overcome and the reaction is allowed to proceed. By means of this invention, therefore, it becomes possible to provide a heat-curable composition which is relatively stable at room temperatures with the consequent advantage to the user of an increased working time.

In addition to the application in heating elements, the compositions of this invention can be formulated for use as electrical insulating and potting materials, sealing material, mold making and coating materials.

The invention is illustrated by the following examples in which the parts are expressed as parts by weight.

EXAMPLE 1

A siloxane composition was prepared by mixing (1) 100 parts of trimethylsiloxy end-stopped copolymer of 99 mole percent dimethylsiloxane units and 1 mole percent of methylvinylsiloxane units, the copolymer having a viscosity of 3,700 cs. at 25° C. and (2) 5 parts of a polydimethylsiloxane end-stopped with $(CH_3)_2HSiO_{1/2}$ groups and having a viscosity of 50 cs. at 25° C.

To 105 parts of this mixture was added, with thorough mixing, a catalyst component consisting of 0.15 ml. of a solution in toluene of a complex prepared by heating together $H_2PtCl_6.6H_2O$ and 1,3-vinyl-1,-1,3-dimethyldisiloxane. The quantity of catalyst employed was equivalent to 3 p.p.m. of platinum based on the total weight of the siloxane mixture. This catalyzed mixture was designated composition A A second catalyzed mixture (composition B) was also prepared in a similar manner except that it additionally contained 0.1 parts of methylethyl ketoxime.

Both compositions had a viscosity of approximately 3,600 cs. at 25° C. and were stored in sealed containers at 25° C. After 24 hours, Composition A was found to have set to a gel. Composition B, however, showed no increase in its original viscosity even after storage for 1 week, but was converted to an elastomeric solid on heating to 80° C. for a period of several hours.

EXAMPLE 2

A composition was prepared by mixing together on a compounding mill 100 parts of copolymeric gum consisting of 99.72 mol percent of dimethylsiloxane units and 0.28 percent of methylvinylsiloxane units. 50 parts of carbon black, and 2 parts of a trimethylsiloxy end-stopped methylhydrogen polysiloxane, having a viscosity of 30 cs. at 25° C. To 152 parts of this composition was added a toluene solution of the platinum catalyst employed in example 1, the proportion of catalyst being sufficient to provide 10 parts per million of platinum based on the total weight of siloxanes in the mixture. This catalyzed composition was designated composition C.

A further catalyzed composition was also prepared (composition D) in similar manner except that it additionally contained 0.2 parts of methylethyl ketoxime.

The two compositions were stored in sealed containers at 25° C. After 24 hours, composition C had cured to as elastomer whereas composition D showed little change in its original plasticity value even after 1 week.

When spread in a thin layer on a fabric substrate, the portion of composition D which had been stored for 1 week was converted into a conductive elastomeric layer on heating for 5 minutes at 200° C.

I claim:

1. An organosilicon composition comprising (1) a compound containing aliphatic carbon atoms linked by multiple bonds, said compound being nongaseous at ambient temperature, (2) a silicon compound containing at least one silicon-bonded hydrogen atom in the molecule, (3) a platinum catalyst and (4) an amount of a compound containing at least one oxime group sufficient to retard the reaction between (1) and (2) at 25° C., said compound being selected from the group consisting of methylethylketoxime, acetaldoxime, acetoxime, dimethyl glyoxime, cyclohexane-1,2-dionedioxime-2,4pentanedione dioxime, and butanedionemethyloxime.

2. A composition as claimed in claim 1 wherein the compound containing aliphatic carbon atoms linked by multiple bonds is an organosilicon polymer wherein at least two of the silicon atoms have attached thereto a radical containing aliphatic unsaturation.

3. A composition as claimed in claim 2 wherein the organosilicon polymer is a diorganopolysiloxane in which the silicon-bonded unsaturated radicals are vinyl radicals and at least 50 percent of the remaining silicon-bonded organic radicals are methyl radicals.

4. A composition as claimed in claim 1 wherein the silicon compound (2) is a linear or substantially linear siloxane polymer containing methyl and/or phenyl radicals as the organic substituents.

5. A composition as claimed in claim i wherein the platinum catalyst is chloroplatinic acid or a complex thereof formed by reaction with a siloxane containing silicon-bonded vinyl radicals.

6. A composition as claimed in claim 1 wherein the oxime compound (4) is methylethyl ketoxime.

7. A composition as claimed in claim 1 wherein the oxime compound is present in a proportion of from 1 to 100 moles per mole of platinum catalyst.

8. A process for the preparation of an organosilicon material which comprises heating to a temperature above 60° C. the composition claimed in claim 1.

9. A composition as claimed in claim 2 wherein the silicon compound (2) is a linear or substantially linear siloxane polymer containing methyl and/or phenyl radicals as the organic substituents.